United States Patent

Terui et al.

Patent Number: 5,286,700
Date of Patent: Feb. 15, 1994

[54] CATALYST AND METHOD OF PREPARING THE CATALYST

[75] Inventors: Sadao Terui, Hyogo; Yoshiyuki Yokota, Suita, both of Japan

[73] Assignee: Nippon Shokubai Co., Ltd., Osaka, Japan

[21] Appl. No.: 964,268

[22] Filed: Oct. 21, 1992

Related U.S. Application Data

[62] Division of Ser. No. 766,092, Sep. 27, 1991, Pat. No. 5,187,137.

[30] Foreign Application Priority Data

Sep. 29, 1990 [JP] Japan ................. 2-262450
Feb. 14, 1991 [JP] Japan ................. 3-043021
Feb. 14, 1991 [JP] Japan ................. 3-043022

[51] Int. Cl.$^5$ ............................. B01J 23/64
[52] U.S. Cl. ............................. 502/324; 502/241
[58] Field of Search ........... 502/241, 324; 423/219

[56] References Cited

U.S. PATENT DOCUMENTS

| | | | |
|---|---|---|---|
| 2,298,607 | 10/1942 | Anderson, Jr. | 423/219 |
| 4,092,227 | 5/1978 | Sugino et al. | |
| 4,206,083 | 6/1980 | Chang | 423/219 |
| 4,207,291 | 6/1980 | Byrd et al. | 423/219 |
| 4,359,039 | 11/1982 | Uchikawa | 126/19 R |
| 4,582,677 | 4/1986 | Sugino et al. | 499/2 |
| 5,080,882 | 1/1992 | Yoshimoto et al. | 423/219 |
| 5,128,301 | 7/1992 | Kobayashi et al. | 502/241 |

FOREIGN PATENT DOCUMENTS

| | | | |
|---|---|---|---|
| 0012800 | 9/1980 | European Pat. Off. | |
| 0257307 | 3/1988 | European Pat. Off. | |
| 0388094 | 9/1990 | European Pat. Off. | |
| 0399302 | 11/1990 | European Pat. Off. | |
| 1377776 | 9/1964 | France | |
| 2218935 | 9/1974 | France | |
| 2325711 | 4/1977 | France | |
| 2441419 | 6/1980 | France | |
| 136940 | 8/1982 | Japan | 423/219 |
| 2201648 | 9/1987 | Japan | 423/219 |
| 2056424 | 3/1981 | United Kingdom | 423/219 |
| 2067912 | 8/1981 | United Kingdom | |
| 2210286 | 6/1989 | United Kingdom | |

*Primary Examiner*—Carl F. Dees
*Attorney, Agent, or Firm*—Oblon, Spivak, McClelland, Maier & Neustadt

[57] ABSTRACT

The catalyst according to the present invention can be utilized effectively as an ozone decomposing catalyst for catalytically decomposing to eliminate ozone contained in a gas or as an ozone deodorizing catalyst for decomposing offensive odor ingredients contained in a gas by catalytic oxidation under the pretense of ozone, and it comprises a composition containing Mn oxide, metal Pd and/or Pd oxide as the essential ingredients formed as a thin film on a support. Further, the performance of the catalyst can be improved by using Mn oxide and Pd as the essential ingredient and using an alumina sol as a binder upon preparation.

1 Claim, No Drawings

CATALYST AND METHOD OF PREPARING THE CATALYST

This is a division, of application Ser. No. 07/766,092, filed on Sep. 27, 1991, now U.S. Pat. No. 5,187,137.

BACKGROUND OF THE INVENTION

1. Field of the Invention

The present invention concerns a catalyst used as an ozone decomposing catalyst for catalytically decomposing to eliminate ozone contained in a gas or as an ozone deodorizing catalyst for catalytically oxidizing to decompose the eliminate offensive odor ingredients contained in a gas under the presence of ozone, as well as a method of preparing such a catalyst.

2. Description of the Prior Art

Since ozone has a strong oxidizing ability and converts itself into harmless oxygen when it is decomposed, it has generally been utilized in various fields with aims for deodorizing, sterilization, bleaching, reduction of COD in effluents or the like. However, since part of ozone utilized in the above-mentioned application use is released as it is, being unreacted, into atmospheric air, it may possibly cause secondary public pollution such as a photochemical smogs. Further, if an aircraft flies through the stratosphere since air containing ozone is drawn into the interior of the aircraft, it may result in a danger of giving undesired effects on passengers and crews. Furthermore, various kinds of high voltage generation devices, for example, dry process copying machines have been used widely in recent years and ozone released from such devices, though little, may contaminate the inside of rooms and brings about an undesired situation not negligible from a circumstantial sanitary point of view.

Ozone not only gives uncomfortable feeling by its odor but also shows a strong toxicity to human a body, which attacks a respiratory organ at a concentration above a certain level and it is extremely harmful when inhaled for a long period of time even if it is in a trace amount. In view of the above, it has been demanded for the establishment of a technique for decomposing to eliminate spent ozone released from various generation sources.

As existent methods of disposing spent ozone there have been known, for example, (I) a treating method with activated carbon, (II) a treating method by liquid chemical cleaning, (III) a treating method by thermal decomposition and (IV) a treating method with an ozone decomposing catalyst. Among them, treatment by using the ozone decomposing catalyst is considered most advantageous for the ozone decomposition since it is free from ignition or explosion danger, requires no waste water treatment and can decompose eliminate ozone at a reduced cost.

Various techniques have been developed so far for the ozone decomposing catalyst and, in particular, a catalyst disclosed in Japanese Patent Laid-Open Sho 62-97643 has an excellent ozone decomposing characteristic and it is put to practical use as an ozone decomposing catalyst that can be used even at a normal temperature by enhancing the activity at low temperature, whereas the existent ozone decomposing catalyst requires heating at high temperature. However, circumstantial problems have attracted an attention, particularly, in recent years, and a catalyst having a higher activity than existent catalyst has been demanded also for the ozone decomposing catalyst.

On the other hand, public pollution caused by offensive odor has been as a social problem and a deodorizing technique for removing ingredients attributable to the offensive odors have been investigated from various aspects. As deodorizing methods practiced so far, there are, for example, (I) water washing, (II) chemical cleaning, (III) adsorption, (IV) direct combustion, (V) catalytic combustion and (VI) ozone oxidization, but they have merits and demerits respectively. Among them, the ozone oxidization method of disposing the offensive odor ingredients by making use of the powerful oxidizing effect of ozone is advantageous since it can be practiced at a relatively low temperature, i.g., about at a room temperature and at a reduced running cost as compared with the various methods described above. However, the method involves a drawback of requiring a long and voluminous reaction zone since the rate of reaction between ozone and offensive odor ingredient in a gas phase is low. Further, since unreacted ozone is released in the atmosphere, it also suffers from a drawback of causing secondary public pollution such as a photochemical smog.

As a means for overcoming the foregoing drawbacks in the ozone oxidization, there has been proposed a method of utilizing a catalyst. In this method, offensive odor ingredients are disposed through decomposition by means of a catalyst under the presence of ozone (hereinafter referred to as ozone deodorizing catalyst). According to this method, ozone reacts with the offensive odor ingredients rapidly requiring no large reaction space and the deodorizing efficiency is improved outstandingly, as well as ozone is decomposed completely to eliminate the worry that unreacted ozone is released into the atmospheric air.

For the ozone deodorizing catalyst various techniques have been developed so far, but their effects have been attained to a through extent depending on the working conditions. That is, there is a drawback that the activity of the catalyst is reduced in an early stage if the catalyst is used continuously for a long period of time or used under a high humidity condition. In view of the above, a catalyst having a higher activity than the existent catalyst has been demanded.

OBJECT OF THE INVENTION

The present invention have been accomplished taking notice on the foregoing situations and the object thereof is to provide a catalyst that can be effectively utilized as an ozone decomposing catalyst or an ozone deodorizing catalyst, as well as a method useful for preparing such a catalyst.

SUMMARY OF THE INVENTION

The catalyst according to the present invention capable of attaining the foregoing object comprises a composition containing Mn oxide, metal Pd and/or Pd oxide as the essential ingredient formed as a thin film on a support. The catalyst can be utilized usefully as an ozone decomposing catalyst for catalytically decomposing ozone contained in a gas or an ozone deodorizing catalyst for catalytically oxidizing to decompose offensive odor ingredients under the presence of ozone.

The method of preparing the catalyst according to the present invention has a feature in coating, on a support, a slurry containing Mn oxide, metal Pd and/or Pd compound and an inorganic oxide sol as a binder.

Further, the method of preparing a catalyst according to the present invention has a feature in using Mn oxide, metal Pd and/or Pd oxide as the essential ingredient and using an alumina sol as a binder. For practicing the preparation method described above, it is optimum to form the catalyst as a thin film on the support, in which the performance of the catalyst can be attained to its full extent.

DESCRIPTION OF THE INVENTION

The present inventors have made a study from various aspects on a catalyst that can be used usefully to each of the above-mentioned application uses. Then, it has at first been found that a catalyst containing Mn oxide, metal Pd and/or Pd oxide as the essential ingredient has a high ozone decomposing ability and has long life, as well as it has a high deodorizing ability under the presence of ozone and is excellent also in the effect for disposing excess ozone.

According to the experimental confirmation of the present inventors, a high performance can be attained by the combination of Mn oxide and Pd (metal Pd and/or Pd oxide), which can not be obtained by each of Mn oxide or Pd alone and it has been found that a catalyst comprising Pd impregnated in and supported on Mn oxide alone or a composition containing Mn oxide has a particularly high ozone decomposing ability and ozone deodorizing ability. That is, the performance of the catalyst comprising the combination of Mn oxide and Pd is superior to the sum of the properties for each of the Pd-containing catalyst (not containing Mn oxide) and the Mn oxide-containing catalyst (not containing Pd), and it has been considered that coexistence of Mn oxide and Pd can provide a satisfactory result to each other in the direction of improving the catalyst.

The present inventors have successively made earnest studies in view of further improving the performance of the catalyst. As a result, it has been found that the catalyst according to the present invention can take a most preferred mode of use when it is formed as a thin film on the support and the effect of the catalyst according to the present invention can be attained wholly in this form.

That is, the catalyst according to the present invention comprises a composition containing Mn oxide, metal Pd and/or Pd oxide as the essential ingredient formed as a thin film on a support. Further, the method of preparing the catalyst according to the present invention comprises coating, on a support, a slurry containing Mn oxide, metal Pd or Pd compound, and an inorganic oxide sol as a binder.

The catalyst according to the present invention contains Mn oxide and Pd (metal Pd and/or Pd oxide) as the essential ingredient in which the mixing ratio for both of them is appropriately about from 1:0.001 to 1:0.15 by atom ratio. Further, there is no particular restriction on the Mn oxide used in the present invention and various oxides may be used such as MnO, $Mn_3O_4$, $Mn_2O_3$ and $MnO_2$, electrolytic manganese dioxide ($MnO_2$) being preferred. On the other hand, there is also no particular restriction on the starting material for Pd used in the present invention and there can be used palladium nitrate, palladium chloride, palladium sulfate, as well as various kinds of complex salts such as $(NH_4)_2PdCl_4$ and $(Pd(NH_3)_4Cl_2)$.

As the support used in the present invention, there can be mentioned various materials such as cordierite or like other inorganic support or metal support. Further, the inorganic support described above may comprise oxides of one or more of elements selected from the group consisting of Ti, Si, Al, Zr and Mg, and such ingredients are preferred coexistent ingredients since they provide excellent adsorption also at a normal temperature.

In the present invention, there is no particular restriction on the molded shape of the entire catalyst and the catalyst may be molded into various shapes such as honeycomb, pellet, square cylinder, circular cylinder, plate, ribbon, corrugated sheet, pipe, doughnut, lattice, etc. Further, there is no particular restriction on the thickness of the thin film and about 5 to 250 $\mu m$ of thickness is suitable. Further, when the catalyst according to the present invention is used for the disposal of ozone, it can be applied to a wide range of ozone content in the gas ranging about from 0.01 to 50,000 ppm, but the range is not restrictive.

As the inorganic oxide sol, there can be mentioned, alumina sol, silica sol, titania sol and zirconia sol, but a catalyst of excellent performance can be obtained by using a alumina sol as described later.

As the method of coating the slurry on the support, any customary method can be employed, for example, a method of coating by dipping the support into the slurry or a method of blowing the slurry to the support.

The method of preparing the catalyst according to the present invention will now be exemplified more specifically as shown in (1) and (2) below. (1) A method of mixing a Mn oxide, metal Pd and/or Pd compound and water, properly heating and subsequently cooling the mixture, adding an inorganic oxide sol such as an alumina sol or a silica sol as a binder forming the mixture into a slurry, dipping a support into the slurry and then taking out the support, removing deposited excess slurry by blowing pressurized air, and further applying drying and baking to obtain a catalyst in which the catalyst ingredient is coated in a thin film on the support. (2) A method of mixing Mn oxide and water, properly heating the mixture, admixing metal Pd and/or Pd compound, cooling the mixture, adding an inorganic oxide sol such as an alumina sol or silica sol as a binder, thereby forming the mixture into a slurry, dipping a support into the slurry and then taking out the support, removing deposited excess slurry by blowing a pressurized air and, further, applying drying and baking to obtain a catalyst in which the catalyst ingredient is coated as a thin film on the support.

It has also been found that the performance of the catalyst can be further improved by using the alumina sol as the binder upon preparation. That is, there are various binders such as organic or inorganic binders used for the catalyst preparation, and inorganic silica sol is used as a most common binder. It has been found that a greater effect of improving the catalyst performance than expected can be obtained remarkably, in particular, under high humidity condition by using the alumina sol as the binder. Although the details for the reason why such an effect can be obtained are not apparent, it is an apparent fact that the catalyst comprising the combination of Mn oxide and Pd undergoes a preferred effect in the direction of improving the performance due to the coexistent of the alumina.

The catalyst according to the present invention contains Mn oxide and Pd as the essential ingredient as described above and it includes, specifically, various embodiments, for example, (1) a catalyst of a composition comprising Mn oxide and Pd formed into a predetermined shape by using an alumina sol, (2) a catalyst in which Mn oxide and Pd are supported on a support by using an alumina sol, (3) a catalyst of a composition containing Mn oxide and Pd formed as a thin film on a support by using a usual binder (silica gel or the like) and, further, (4) a catalyst of a composition comprising Mn oxide and Pd formed as a thin film on support by using an alumina sol. In particular, the embodiment (4) can provide the effect of the catalyst according to the present invention to its full extent.

There is no particular restriction on the procedures for preparing the catalyst by using the alumina sol, and the following methods (1) and (2) can be mentioned as typical preparation methods. (1) A method of kneading Mn oxide, metal Pd and/or Pd compound and an alumina sol, subsequently, extrusion molding the mixture and, further, applying drying and baking to obtain an integrally molded catalyst. (2) A method of immersing a support into a slurry containing Mn oxide, metal Pd and/or Pd compound and an alumina sol, taking out the support, removing deposited excess slurry, for example, by blowing a pressurized air and, further, applying drying and baking to obtain a catalyst in which the catalyst ingredient is coated as a thin film on the support.

EXAMPLE

The present invention will now be described more in details referring to examples but the following examples do not restrict the present invention and any of design modifications in view of the gist described above and later will be included in the technical scope of the present invention.

EXAMPLE 1

A catalyst was prepared as described below.

At first, a composite oxide comprising Ti and Si was prepared by the following procedures.

An aqueous sulfuric acid solution of titanyl sulfate of the following composition was used as a Ti source.

| TiOSO$_4$ | 250 g/l (converted as TiO$_2$) |
| Total H$_2$SO$_4$ | 1100 g/l |

A solution prepared by adding 28 liters of an aqueous ammonia (NH$_3$, 25%) were added to 40 liter of water, to which 2.4 kg of Snowtex-NCS-30 (silica sol, containing about 30% by weight of SiO$_2$ product of by Nissan Chemical Co.) was added was provided separately. An aqueous titanium-containing sulfuric acid solution prepared by diluting 15.3 liters of the aqueous sulfuric acid solution described above with addition of 30 liters of water was gradually dropped under stirring to the above-mentioned solution to form coprecipitate gel and it was stood still for further 15 hours. The thus obtained TiO$_2$—SiO$_2$ gel was filtrated and washed with water and then dried at 200° C. for 10 hours.

Then, the gel was calcined at 550° C. in an air atmosphere for 6 hours. The resultant powder had a composition of TiO$_2$: SiO$_2$=4:1 (molar ratio) and a BET surface area of 185 m$^2$/g.

An ozone decomposing catalyst was prepared by using the resultant powder (hereinafter referred to as TS-1 powder) by the procedures described below.

After adding an appropriate amount of water to 10 kg of the TS-1 powder and well mixing them, the mixture was sufficiently kneaded in a kneader, a homogeneous kneading product was extrusion molded to fabricate a lattice-like honeycomb of 50 mm height, 50 mm width and 50 mm length (wall thickness: 0.15 mm, opening: 0.89 mm), which was dried at 150° C. for 5 hours and, subsequently, calcined at 500° C. in an air atmosphere for 2 hours to prepare a honeycomb molding product.

Then, an appropriate amount of water was mixed under stirring with an aqueous palladium nitrate solution containing 9 g of Pd and 450 g of a manganese dioxide powder with a specific surface area of 45 m$^2$/g, at a room temperature for 30 min, which was successively heated at 90° C., possessed under stirring for 30 min, and cooled to a room temperature to which an appropriate amount of silica sol was added to prepare a slurry.

The lattice honeycomb as described above was immersed in the slurry for about 30 sec. Subsequently, the honeycomb was taken out from the slurry and clogging in the entire cell was removed by eliminating excess slurry in the cell by blowing pressurized air, dried at 150° C. for two hours and calcined at 350° C. for 2 hours to obtain a complete catalyst. In the thus obtained catalyst, a thin film containing MnO$_2$ (75 g) and Pd (1.5 g) per one liter of the catalyst was formed on the support. Further, the thickness of the thin film in the cell was 50 um at the maximum portion for the corner and 5 um at the minimum portion on the inner wall.

EXAMPLE 2

A lattice honeycomb was fabricated in the same procedures as those in Example 1 except for using γ-Al$_2$O$_3$ powder with a specific surface area of 130 m$^2$/g instead of the TS-1 powder, and a complete catalyst was obtained in the same manner as in Example 1 except for using the lattice honeycomb. In the thus obtained catalyst, a thin layer containing MnO$_2$ (75 g) and Pd (1.5 g) per one liter of the catalyst was formed on the support.

EXAMPLE 3

A complete catalyst was obtained in the same procedures as those in Example 1 except for using a catalyst comprising alumina-silica inorganic fibers in which gas inflow cells were contained by the number of 500 per 1 square inch of a transversal cross section instead of the honeycomb molding product comprising the TS-1 powder. In the thus obtained catalyst, a thin film containing MnO$_2$ (75 g) and Pd (1.5 g) per one liter of the catalyst was formed on the support.

EXAMPLE 4

After adding appropriate amount of water to 450 g of a manganese dioxide powder with a specific surface area of 45 m$^2$/g and dispersing them under stirring and heating to 90° C., an aqueous palladium nitrate solution containing 9 g of Pd was dropped. After the completion of the dropping, they were maintained under stirring at 90° C. for 30 min and then cooled to a room temperature and a slurry was prepared by adding an appropriate amount of a silica sol.

Then, the lattice honeycomb obtained in Example 1 was immersed in the above-mentioned slurry for about 30 sec. Then, the honeycomb was taken out from the slurry, clogging in the whole cell was eliminated by removing the excess slurry in the cell by blowing the pressurized air, then successively drying the same at 150° C. for 2 hours and then calcined it at 350° C. for 2 hours to obtain a complete catalyst. In the thus obtained catalyst, a thin film containing MnO$_2$ (75 g) and Pd (1.3 g) per one liter of the catalyst was formed on the support.

EXAMPLE 5

A complete catalyst was obtained in the same procedures as those in Example 1 except for using manganese dioxide with a specific surface area of 45 m$^2$/g and increasing the amount to twice, i.e., to 900 g. In the thus obtained catalyst, a thin film containing MnO$_2$ (150 g) and Pd (1.5 g) per one liter of the catalyst was formed on the support.

EXAMPLE 6

A complete catalyst was obtained in same procedures as those in Example 1 except for using an aqueous palladium nitrate solution containing 4.5 g of Pd instead of the aqueous palladium nitrate solution containing 9 g of Pd. In the thus obtained catalyst, a thin film containing MnO$_2$ (75 g) and Pd (0.75 g) per one liter of the catalyst was formed on the support.

EXAMPLE 7

A complete catalyst was obtained in the same procedures as those in Example 1 except for using dinitrodiamino palladium (Pd(NH$_3$)$_2$(NO$_3$)$_2$) instead of palladium nitrate. In the thus obtained catalyst, a thin film containing MnO$_2$ (75 g) and Pd (1.5 g) was formed on the support.

EXAMPLE 8

An aqueous palladium nitrate solution containing 10.4 g of Pd was added to an aqueous manganese nitrate solution containing 1 kg of manganese nitrate (Mn(NO$_3$)$_2$.6H$_2$O) dissolved therein and 10 liter of an aqueous 5% KMnO$_4$ solution was dropped under stirring. After the dropping was over, it was stirred for further one hour and, subsequently, a precipitate was separated by filtration while sufficiently washing it with distilled water. The resultant solids were dried at 120° C. and further, calcined at 400° C. to prepare 520 g of manganese dioxide containing 10.3 g of Pd. Distilled water was added to manganese dioxide described above and pulverized in a wet process and, subsequently, a slurry was prepared by adding a silica sol.

Then, the lattice honeycomb obtained in Example 1 was immersed into the above-mentioned slurry for about 30 sec. Subsequently, the honeycomb was taken out from the slurry and clogging in the whole cell was eliminated by removing the excess slurry in the cell by blowing pressurized air and then dried at 150° C. for 2 hours and calcined at 350° C. for 2 hours, to obtain a complete catalyst. In the thus obtained catalyst, a thin film containing MnO$_2$ (72 g) and Pd (1.4 g) per one liter of the catalyst was formed on the support.

EXAMPLE 9

An aqueous palladium nitrate solution containing 10 g of Pd was added to an aqueous manganese nitrate solution containing 1.65 kg of manganese nitrate (Mn(NO$_3$)$_2$.6H$_2$O) dissolved therein and 6.5 liter of an aqueous 2N sodium hydroxide solution was dropped under stirring. After the dropping was over, it was stirred for further one hour and, subsequently, precipitate was separated by filtration while sufficiently washing with distilled water. The resultant solids were dried at 120° C. and calcined at 400° C. to prepare 490 g of manganese dioxide containing 9.5 g of Pd. Subsequently, in the same procedures as those in Example 8, a lattice honeycomb catalyst was obtained in which a thin film containing MnO$_2$ (70 g) and Pd (1.4 g) was formed per one liter of the catalyst. Comparative Example 1

The honeycomb molding product obtained in Example 1 was impregnated with an aqueous manganese nitrate solution, dried at 120° C. for 3 hours and calcined at 450° C. for 3 hours. Subsequently, it was impregnated with an aqueous palladium nitrate solution, dried at 120° C. for two hours and then calcined at 450° C. for two hours to obtain a complete catalyst. The thus obtained catalyst comprised TS-1 (408 g), MnO$_2$ (102 g) and Pd (2 g) per one liter of the catalyst.

EXAMPLE 10

An endurance test was applied to each of the catalysts obtained in Examples 1 to 9 and Comparative Example 1. Namely the endurance test was conducted by charging each of the catalysts into a stainless steel tubular reactor and introducing air containing 150 ppm of ozone in an atmosphere at a temperature of 25° C. and a relative humidity of 40%, at a linear flow rate of 0.5 m/sec (space velocity: 72,000 hr$^{-1}$) for 80 hours into a catalyst layer, and ozone decomposition ratio before and after the endurance test was investigated. The ozone decomposing ratio before and after the endurance test was measured under the conditions of ozone concentration at 5 ppm, temperature at 25° C., relative humidity at 40% and space velocity at 72,000 hr$^{-1}$ and it was determined in accordance with the following equation (1):

$$\text{Ozone decomposing ratio} = \left(1 - \frac{\text{ozone concentration at exit of catalyst layer}}{\text{ozone concentration at inlet of the catalyst}}\right) \times 100 \quad (1)$$

The results are shown in Table 1. It can be seen that the catalyst satisfying the conditions of the present invention have high ozone decomposing ability and possess excellent ozone decomposing ratio even after conducting the endurance test for 80 hours.

TABLE 1

| | Ozone decomposing ratio (%) | |
|---|---|---|
| Catalyst | Before endurance test | 80 hr after endurace test |
| Example 1 | 100 | 94 |
| Example 2 | 100 | 92 |
| EXample 3 | 100 | 91 |
| Example 4 | 100 | 98 |
| Example 5 | 100 | 95 |
| Example 6 | 100 | 88 |
| Example 7 | 100 | 93 |
| Example 8 | 100 | 92 |
| Example 9 | 100 | 90 |
| Comparative Example 1 | 100 | 74 |

EXAMPLE 11

For each of the catalysts obtained in Examples 1, 4 and Comparative Example 1, the deodorization ratio was determined as shown below. Namely, each of the catalysts was charged in a stainless steel tubular reactor and air containing 20 ppm of methylmercaptane and 20 ppm of ozone was introduced at a linear flow rate of 0.31 m/sec (space velocity: 45,000 hr$^{-1}$) in an atmosphere at a temperature of 25° C. and a relative humidity of 40%, to determine the deodorization ratio after 22 hours. The deodorization ratio was determined in accordance with the following equation (2):

$$\text{Deodorization ratio} = \left(1 - \frac{\text{methylmercaptane concentration at exit of the catalyst}}{\text{Methylmercaptane concentration at inlet of catalyst}}\right) \times 100 \quad (2)$$

The results are shown in Table 2. It can be seen that the catalysts satisfying the conditions of the present invention show high deodorization ratio even after the elapse of 22 hours. After the deodorization, there was scarcely excess ozone and thus ozone was also decomposed substantially completely.

TABLE 2

| Catalyst | Deodorization ratio (%) |
| --- | --- |
| Example 1 | 92 |
| Example 4 | 94 |
| Comparative Example 1 | 65 |

EXAMPLE 12

A catalyst composition slurry was prepared by the following procedures. After adding an appropriate amount of water to 450 g of a manganese dioxide powder with a specific surface area of 45 m$^2$/g, it was dispersed under stirring and heated to 90° C., and then an aqueous palladium nitrate solution containing 9 g of Pd was dropped. After the dropping was over, they were maintained under stirring at 90° C. for 30 min and, after cooling to a room temperature, 761 g of an alumina sol (opaque) containing about 10% by weight of Al$_2$O$_3$ was added to prepare a slurry.

The lattice honeycomb obtained in Example 1 was immersed into the slurry for about 30 sec. Subsequently, it was taken out from the slurry and clogging in the whole cell was eliminated by removing the excess slurry in the cell by blowing the pressurized air. Subsequently, it was dried at 150° C. for two hours and then calcined at 350° C. for two hours to obtain a complete catalyst. In the thus obtained catalyst, a thin film containing MnO$_2$ (75 g) and Pd (1.5 g) per one liter of the catalyst was formed on the support.

EXAMPLE 13

A complete catalyst was obtained in the same procedures as those in Example 12 except for using 761 g of an yellow transparent alumina sol (containing about 10% by weight of Al$_2$O$_3$) instead of using the opaque alumina sol.

EXAMPLE 14

A complete catalyst was obtained in the same procedures as those in Example 12 except for changing the amount of the opaque alumina sol used from 761 g to 380 g. In the thus obtained catalyst, a thin film containing MnO$_2$ (75 g) and Pd (1.5 g) per one liter of the catalyst was formed on the support.

EXAMPLE 15

A lattice honeycomb was obtained by preparing a lattice honeycomb in the same procedures as those in Example 1 except for using γ-Al$_2$O$_3$ powder with a specific surface area of 130 m$^2$/g instead of the TS-1 powder and a complete catalyst was obtained in the procedures as those in Example 12 except for using the lattice honeycomb. In the thus obtained catalyst, a thin film containing MnO$_2$ (75 g) and Pd (1.5 g) per one liter of the catalyst was formed on the support.

EXAMPLE 16

A complete catalyst was obtained in the same procedures as those in Example 12 except for using a corrugated support comprising alumina-silica inorganic fibers having gas inflow cells by the number of 500 per one square inch of the transverse cross section, instead of the honeycomb molding product comprising the TS-1 powder. In the thus obtained catalyst, a thin film containing MnO$_2$ (75 g) and Pd (1.5 g) per one liter of the catalyst was formed on the support.

EXAMPLE 17

A complete catalyst was obtained in the same procedures as those in Example 12 except for using an aluminum honeycomb support having gas inflow cells by the number of 600 per one square inch of the transverse cross section, instead of the honeycomb molding product comprising the TS-1 powder. In the thus obtained catalyst, a thin film containing MnO$_2$ (75 g) and Pd (1.5 g) per one liter of the catalyst was formed on the support.

EXAMPLE 18

An aqueous palladium nitrate solution containing 33.9 g of Pd was dropped to 10 kg of a manganese dioxide powder with a specific surface area of 45 m$^2$/g, and they were kneaded for two hours after the dropping was over. Subsequently, 2030 g of an alumina sol (opaque, containing about 10% by weight of Al$_2$O$_3$) was added and mixed sufficiently in a kneader and then further kneaded thoroughly by a kneader. The thus obtained homogeneous kneading product was extrusion molded to fabricate a lattice honeycomb with an outer shape of 50 mm height, 50 mm width and 50 mm length (wall thickness: 0.15 mm, opening: 0.89 mm), which was dried at 150° C. for 5 hours and, subsequently, calcined in an air atmosphere at 500° C. for two hours to prepare a honeycomb catalyst. The thus obtained catalyst contained MnO$_2$ (590 g) and Pd (2 g) per one liter of the catalyst.

EXAMPLE 19

A complete catalyst was obtained in the same procedures as those in Example 1 except for using 304 g of a zirconia sol (containing about 25% by weight of ZrO$_2$) instead of 761 g of the alumina sol (opaque, containing about 10% by weight of Al$_2$O$_3$). In the thus obtained catalyst, a thin film containing MnO$_2$ (75 g) and Pd (1.5 g) per one liter of the catalyst was formed on the support.

EXAMPLE 20

A complete catalyst was obtained in the same procedures as those in Example 1 except for using 761 g of a titania sol (containing about 10% by weight of TiO$_2$) instead of 761 g of the alumina sol (opaque, containing about 10% by weight of Al$_2$O$_3$). In the thus obtained catalyst, a thin film containing MnO$_2$ (75 g) and Pd (1.5 g) per one liter of the catalyst was formed on the support.

EXAMPLE 21

A complete catalyst was obtained in the same procedures as those in Example 1 except for using 572 g of a ceria sol (containing about 13.3% by weight of $CeO_2$) instead of 761 g of the alumina sol (opaque, containing about 10% by weight of $Al_2O_3$). In the thus obtained catalyst, a thin film containing $MnO_2$ (75 g) and Pd (1.5 g) per one liter of the catalyst was formed on the support.

EXAMPLE 22

Ozone decomposing test was conducted to each of the catalysts obtained in Examples 12 to 21. Namely, each of the catalysts was cut into 25 mm length, charged into a stainless steel tubular reactor. Air containing 0.5 ppm of ozone was introduced into a catalyst layer at a flow rate of 16.25 $Nm^3/hr$ (space velocity: 260,000 $hr^{-1}$) and the ozone decomposing ratio was investigated after 20 hours. The ozone decomposing ratio was determined by the formula (1) described previously.

The results are shown in Table 3 and it can been seen that the catalysts obtained according to the present invention maintain excellent ozone decomposing ratio even to ozone at low concentration.

TABLE 3

| Catalyst | Ozone decomposing ratio (%) |
| --- | --- |
| Example 1 | 56 |
| Example 12 | 77 |
| Example 13 | 79 |
| Example 14 | 88 |
| Example 15 | 76 |
| Example 16 | 75 |
| Example 17 | 76 |
| Example 18 | 74 |
| Example 19 | 65 |
| Example 20 | 54 |
| Example 21 | 61 |

What is claimed is:

1. A catalyst consisting essentially of Mn oxide and palladium selected from the group consisting of metallic palladium, Pd oxide and mixtures thereof, the Mn oxide and palladium being in a mixing ratio of 1:0.001-1:0.15 by Mn-Pd atom ratio, and a support carrying on its surface said catalyst in a thickness of 5-250 μm.